Apr. 10, 1923. 1,451,580
M. T. LINDENBERG
LIQUID MOTOR
Filed Jan. 30, 1922  4 sheets-sheet 2

Inventor:
M. T. Lindenberg
Attys.

Apr. 10, 1923. 1,451,580
M. T. LINDENBERG
LIQUID MOTOR
Filed Jan. 30, 1922 4 sheets-sheet 4

Inventor:
M. T. Lindenberg
by
Attys.

Patented Apr. 10, 1923.

1,451,580

UNITED STATES PATENT OFFICE.

MORITZ THEODORE LINDENBERG, OF BOSTON, MASSACHUSETTS.

LIQUID MOTOR.

Application filed January 30, 1922. Serial No. 532,922.

*To all whom it may concern:*

Be it known that I, MORITZ THEODORE LINDENBERG, a citizen of the United States, residing at Boston, in the county of Suffolk and State of Massachusetts, have invented new and useful Improvements in Liquid Motors, of which the following is a specification.

The invention is embodied in a motor which is to a great extent auto-dynamic, and requires for the continuity of its operation, (wear and breakage excepted), only the maintenance of a supply of liquid at a suitable elevation, and so circulated and controlled in a series of tanks, that non-synchronous vertical reciprocating movements are imparted to a series of buoyant weights in said tanks, means being provided for translating the said reciprocating movements into continuous unidirectional torque in a power-transmitting shaft, the latter not only transmitting power for a useful purpose outside the motor, but also controlling elements which govern the circulation of the liquid, and cause the latter to impart the said non-synchronous reciprocating movements to the buoyant weights.

A battery is employed composed of an even number of units, each unit including a tank and a buoyant weight, the number shown in the present embodiment of the invention being eight. Liquid is exhausted from and admitted to these tanks in such manner that half of the entire number of weights are left, by falling liquid, unsupported and free to fall by gravity, and thus to turn the power-transmitting shaft in a predetermined direction, and the other weights are at the same time supported by rising liquid, so that the displacement of the weights acts to turn the transmitting shaft in the same direction. The force directed by the falling weights is less than that exerted by the rising weights, and this difference in force is an important factor in continuously operating the motor. All of the falling weights are at all times at different elevations, and the same is true of all the rising weights, these differences in elevation being another important factor, all of which will be rendered clear by the following description referring to the diagrammatic figures of the drawing.

Of the accompanying drawings forming a part of this specification,—

Figure 1 is a plan view of a liquid motor embodying the invention.

Figure $2^a$ is a section on line $2^a$—$2^a$ of Figure 2.

Figure $2^b$ is a section on line $2^b$—$2^b$ of Figure 2.

The same reference characters indicate the same parts in all of the figures.

Figures 2, 3, 4:
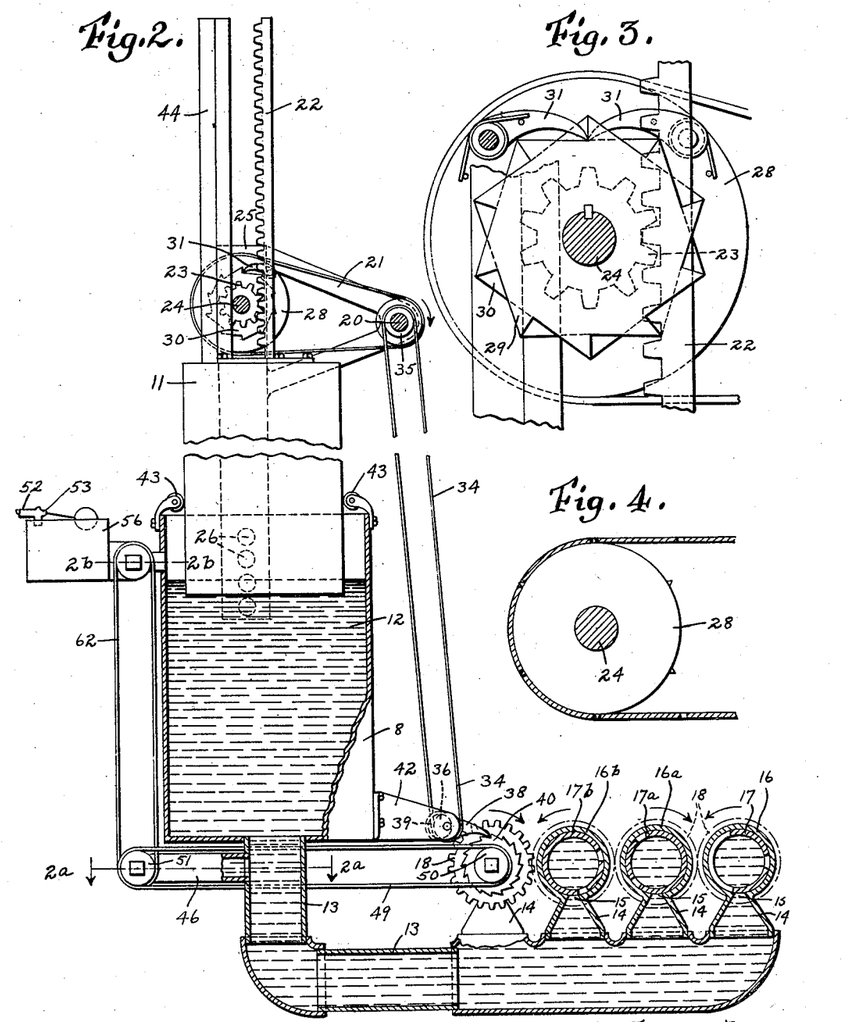
Figure 2 is a section on line 2—2 of Figure 1, and an elevation of parts at the right of said line.
Figure 3 is an enlarged fragmentary view, showing one of the hereinafter described rock-shafts in transverse section, and means associated with one of the weights and with the rock-shaft to translate reciprocating movements of the weights into continuous unidirectional torque.
Figure 4 is an enlarged side view of one of the pulleys hereinafter described, and a sectional view of a belt engaged with the pulley.

Mounted on a suitable supporting frame 7, portions of which are shown by dotted lines in Figure 2, are a series of tanks 8, arranged preferably in a straight row, eight tanks being necessary in the embodiment of the invention here shown. Vertically movable in said tanks are buoyant weights 11, adapted to be supported by liquid 12 in the tanks, there being one weight for each tank. Said tanks and weights constitute a battery, and a motor embodying the invention may include one battery, or more than one. Each weight 11 is preferably a box closed at its bottom and sides, so that its buoyant. The weight is sufficiently ponderous to function, as hereinafter described, when falling.

I provide automatically selective means for transferring liquid from any tank 8 to other tanks in a predetermined order, to leave the buoyant weight in one tank entirely unsupported by liquid and free to fall by its own weight, and thus perform a part of its function, and at the same time support and raise the weight in another tank, the last-mentioned tank performing a part of its function by displacement. To this end I connect with the bottom of each tank a conduit 13, preferably elbow-shaped, as shown by Figure 2. The horizontal portion of each conduit 13 is provided with four branches 14, the upper ends of which form ports 15, communicating with cylindrical valve casings of which there are four, each extending the entire length of the series of tanks, said casings being designated respectively, 16, 16ª, 16ᵇ and 16ᶜ in Figures 1 and 2.

Mounted to turn in each valve casing is a cylindrical tubular valve, extending from end to end of the casing. Said valves are called tank-connecting valves, and are designated respectively 17, 17ª, 17ᵇ and 17ᶜ in Figures 1 and 2. The valve 17ᶜ is not shown in Figure 2, and is shown only by dotted lines in Figure 1.

Flat developments of the said valves are shown by Figures 5, 6, 7, and 8, from which it will be seen that each valve has a plurality of ports, formed in zones of the valve coinciding with the fixed conduit ports 15, the arrangement of the latter relatively to said zones being indicated diagrammatically by dotted lines in these figures. Said valve ports are identified by reference numerals in the description of the operation hereinafter contained. It is sufficient for the present to say that each valve is rotated step-by-step in its casing by means hereinafter described, in such manner that ports in two of its zones register simultaneously with two of the fixed ports 15, so that communication is established between two of the tanks, permitting liquid to flow from one of said tanks to the other, the flow being outward from one of the tanks through a conduit 13, to the valve portion between said ports, and inward through another conduit 13 to the other tank.

The different tank-connecting valves act successively in establishing such communication, so that each tank is connected with each of the other tanks successively in a predetermined order, as will more fully appear hereinafter.

To one end of each tank-connecting valve is fixed a stem journaled in one end of the accompanying casing, and to these stems are fixed gears 18, forming a train through which the valves are rotated simultaneously step-by-step, by power applied as hereinafter described, to the gear on the inner valve 17ᶜ, the directions of rotation of the valves being indicated by arrows in Figure 2.

The transfer of liquid from one tank to another leaves the buoyant weight in one of the two tanks unsupported by liquid and free to fall, the weight in the other tank being supported and raised by rising liquid, and exerting a greater force on the power shaft hereinafter described than the falling weight.

The rise and fall of the weights is caused to impart a continuous unidirectional rotation through suitable connections to a main power shaft 20, journaled in bearings supported by fixed brackets 21. To each weight is fixed a vertical rack-bar 22, meshing with a pinion 23, which is keyed to a short rock-shaft 24, journaled in bearings supported by fixed supporting members 25. Said members may be uprights riveted at 26 (Figure 2), to the tanks. There is a rock-shaft 24 for each weight, and each rock-shaft 24 is reversely rotated by the rise and fall of the accompanying weight.

To impart unidirectional rotation from the rock-shafts 24 to the main shaft 20, I provide each rock-shaft 24 with two loose pulleys 27 and 28, and with two ratchets 29 and 30 which are fixed to the shaft, the teeth of one ratchet facing oppositely to those of the other. Each loose pulley is provided with a spring-pressed pawl 31, the pawl of the pulley 27 engaging the ratchet 29, while the pawl of the pulley 28 engages the ratchet 30. The pulley 27 is connected by a crossed belt 32, and the pulley 28 by an open or straight belt 33, with pulleys fixed to the main shaft 20.

Power is communicated from the shaft 20 to one of the valve gears 18, to drive the train of valve gears intermittently, by a belt 34 running on a pulley 35 on the main shaft, and driving a pulley 36 on a shaft 37, a pawl 38 engaged with an eccentric 39 on the shaft 37, and a ratchet 40 fixed to one of the end gears 18. The rotation of the shaft 37 reciprocates the pawl 38, and causes it to rotate the train of gears 18 and the tank-connecting valves step-by-step. The shaft 37 is journaled in bearings in a fixed support 42, which may be a bracket or brackets fixed to one of the tanks.

To suitably guide and steady the buoyant weights 11, and maintain the rack-bars 22 in mesh with the pinions 23, I provide guide rolls 43 supported by the tanks and bearing on opposite sides of the weights, and guide bars 44 fixed to the weights and in sliding contact with rock-shafts 24, at the sides of the latter, opposite the rack-bars 22. There are preferably two of said guide bars on each weight, as shown by Figure 1, and they are arranged at opposite sides of the rock-shaft pinion 23 (Figure 2), so that the pinion and guide bars cooperate in preventing horizontal displacement of the weight, in two opposite directions.

Figures 1, 2A, 2B:
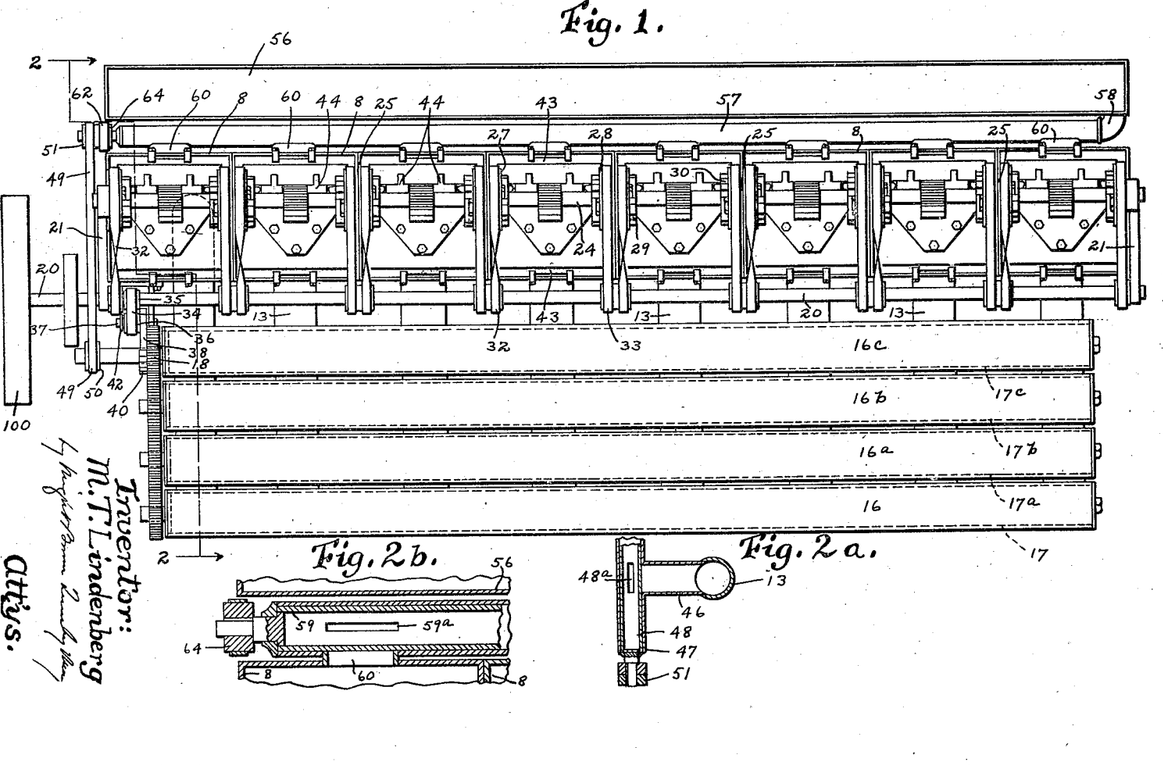

As shown by Figures 1, 2, 2ª, and 2ᵇ, the apparatus includes valve-controlled means for exhausting liquid from the conduits 13, said means being preferably organized as follows: short horizontal conduits or exhaust pipes 46, connect the conduits 13 with a cylindrical valve casing 47, (one of said pipes and a portion of said casing being shown by Figure 2ª). A cylindrical tubular exhaust valve 48 (Figures 2ª and 10), having helically arranged ports 48ª is rotatable step-by-step in the casing 47 by a belt 49 (Figure 2), running on pulleys 50 and 51 (Figure 2), fixed respectively to one of the end gears 18 (Figure 2), and to the valve 48 (Figure 2ª). The weight tanks 8 are supplied with liquid, as hereinafter described, by an elevated supply tank 56, in which a body of liquid may be maintained at a predetermined height, by a supply conduit 52, controlled by a ballcock 53. A tubular valve casing 57 (Figure 1) is connected by an elbow-shaped conduit 58 (Figure 1) with the tank 56, and contains a tubular inlet valve 59 (Figure 2ᵇ), having helically arranged ports 59ª, and rotatable step-by-step in the valve casing 57. Short conduits or passages 60 (Figures 1 and 2ᵇ) connect the valve casing 57 with the tanks 8.

Said exhaust and inlet valves are rotated simultaneously step-by-step by a belt 62 running beside the belt 49 on the pulley 51, the latter being long enough to accommodate both belts, and on a pulley 64 fixed as shown by Figure 2 to the stem of the inlet valve 59.

Figures 6, 7, 8, 9, 10:
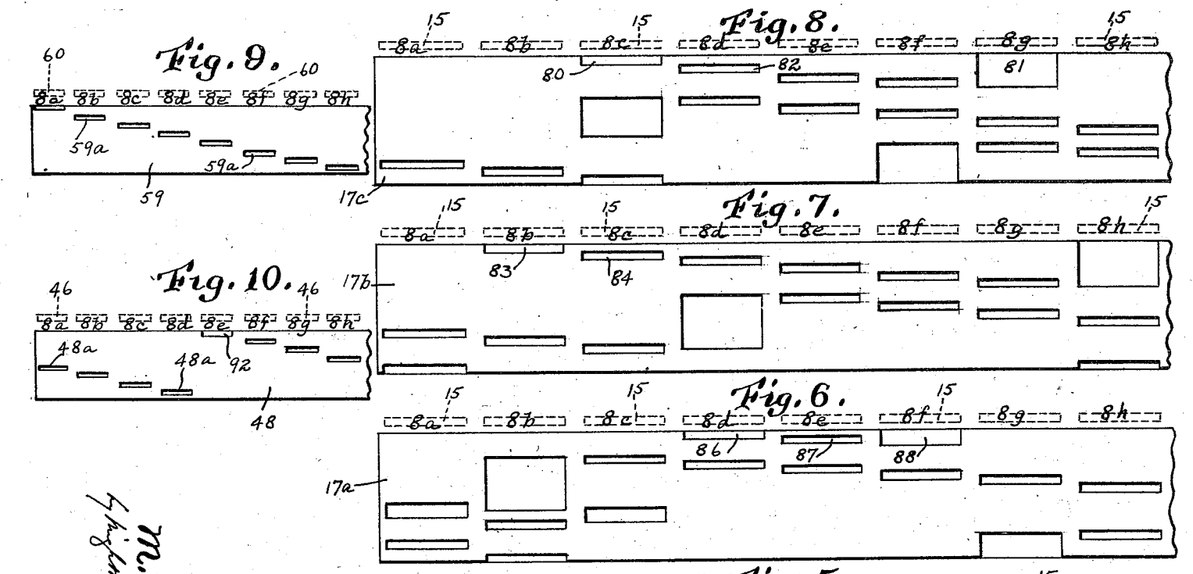
Figures 9 and 10 are developments respectively of the inlet and exhaust valves hereinafter described.

The exhaust valve 48 and the inlet valve 59 are shown developed by Figures 9 and 10, the ports 48ª and 59ª of said valves being arranged as shown by these Figures. The exhaust-valve casing ports 46 are shown by dotted lines in Figure 10, and the inlet-valve casing ports 60 are shown by dotted lines in Figure 9.

For convenience in the following description, I have added to the reference numerals 8 designating the weight tanks, the exponents shown on Figures 11 to 26, inclusive, the tanks in said figures being designated in the order of their arrangement, 8ª, 8ᵇ, 8ᶜ, 8ᵈ, 8ᵉ, 8ᶠ, 8ᵍ and 8ʰ.

Figure 11:
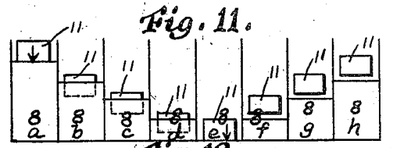
Figures 11 to 26 are diagrammatic views, showing the tanks and the buoyant weights at different stages of the operation.

In preparing the motor for operation, all the valves are closed, and liquid is introduced to the tanks to initially locate the weights 11, at the different heights shown by Figure 11, the weight in tank 8ª being at the highest point of its travel, and the weight in the tank 8ᵉ at the lowest point. When the motor is in operation, the tank-connecting valves intermittently regulate the liquid levels of the various tanks. When the liquid in any tank reaches a predetermined low level, the exhaust valve 48 (Figure 2ª) opens and exhausts the remaining liquid. The inlet valve 59 (Figure 2ᵇ) at predetermined times admits liquid to the upper portions of the weight tanks, until the liquid thus admitted, and the liquid entering the lower ends of the weight tanks, establish the desired high liquid level.

The arrangement of the ports in the tank-connecting valves 17 and 17ᶜ (Figure 1) is such that when the valves are simultaneously stepped forward, at the commencement of the operation, ports 80 and 81 in valve 17ᶜ register simultaneously with the two corresponding fixed conduit ports 15, thereby connecting tanks 8ᶜ and 8ᵍ; ports 83 and 85 in valve 17ᵇ register simultaneously with two other corresponding fixed ports 15, thereby connecting tanks 8ᵇ and 8ʰ; ports 86 and 88 in valve 17ª register simultaneously with the two other fixed ports 15, and thereby connect tanks 8ᵈ and 8ᶠ. Valve 17 also moves, but is not caused by this movement to register any ports. The movement of the exhaust valve 48 and inlet valve 59 occurring at the same time, causes port 59ª in valve 59 to register with a port 60 communicating with supply tank 56, thus causing the filling of weight tank 8ª to the initial high level, and causing port 48ª in exhaust valve 48 to register with a valve chamber port 46, allowing the liquid remaining in the weight tank 8ᵉ, the weight in which has now reached its lowest point, to escape through the exhaust valve 48.

Figure 5:
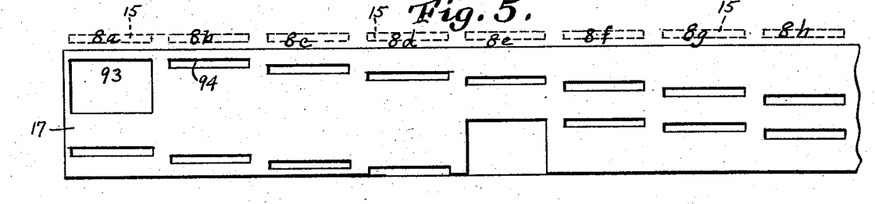
Figures 5, 6, 7 and 8 are developments of the tubular valves constituting elements of the liquid circulating means hereinafter described.

The valves 17, 17ª, 17ᵇ and 17ᶜ now step forward again, so that ports 81 and 82 in valve 17ᶜ register with two of the fixed ports 15 to connect tanks 8ᵈ and 8ᵍ, as shown by Figure 8; ports 84 and 85 in valve 17ᵇ register with two fixed ports 15 to connect tanks 8ᶜ and 8ʰ as shown by Figure 7; ports 87 and 88 in valve 17ª register with two fixed ports 15 to connect tanks 8ᵉ and 8ᶠ; and ports 93 and 94 in valve 17 register with two fixed ports 15 to connect tanks 8ª and 8ᵇ, as shown by Figure 5. The exhaust and inlet valves also move at the same time, but do not register any ports.

Without describing in detail the results of the additional step movements of the tank-connecting valves until a complete rotation thereof is effected, it may be stated that the valve ports continue to move step-by-step, each step registering to ports in a valve zone, with the corresponding fixed ports 15, and connecting the tanks among themselves, and with the exhaust and inlet valves in timed relation, to cause the cycles of operation illustrated diagrammatically by Figures 11 to 26 and next described, with reference to said figures.

Each of said figures shows the positions of the weights 11 in the several tanks, at the beginning of a cycle, the organization here shown including eight tanks, and requiring sixteen cycles to cause a complete upward and downward movement of each of the eight weights, and leave the weights in the initial positions shown by Figure 11.

The motor being started when the weights are in said initial positions, the relations set forth by the following tables are established, the change stated by each table being established simultaneously.

Table 1.

Liquid contents of tank $8^a$ and tank $8^b$ equalize in level,
Liquid contents of tank $8^h$ and tank $8^c$ equalize in level,
Liquid contents of tank $8^g$ and tank $8^d$ equalize in level, and
Liquid contents of tank $8^f$ and tank $8^e$ equalize in level.

Figure 12:
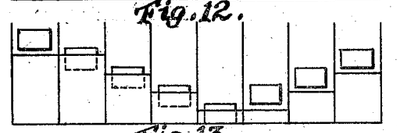

This cycle establishes the relation shown in Figure 12.

Table 2.

Liquid contents of tank $8^a$ and tank $8^c$ equalize,
Liquid contents of tank $8^h$ and tank $8^d$ equalize, and
Liquid contents of tank $8^g$ and $8^e$ equalize.

Figure 13:
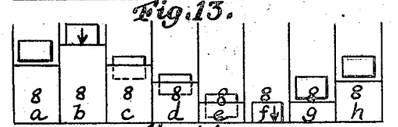

Tank $8^f$ empties and an equal amount is supplied to tank $8^b$, establishing the relation as shown in Figure 13.

Table 3.

Liquid contents of tank $8^a$ and tank $8^d$ equalize,
Liquid contents of tank $8^h$ and tank $8^e$ equalize,
Liquid contents of tank $8^g$ and tank $8^f$ equalize, and
Liquid contents of tank $8^b$ and tank $8^c$ equalize.

Figure 14:
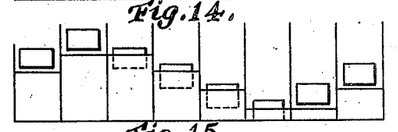

By this operation the relation shown in Figure 14 is established.

Table 4.

Liquid contents of tank $8^a$ and tank $8^e$ equalize,
Liquid contents of tank $8^h$ and tank $8^f$ equalize, and
Liquid contents of tank $8^b$ and $8^d$ equalize.

Figures 15, 16:
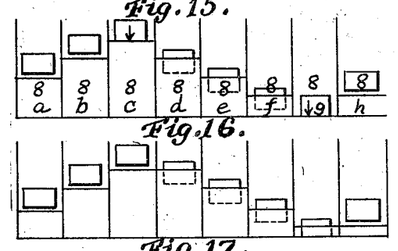

Tank $8^g$ empties and tank $8^c$ has an equal volume of liquid supplied and the condition in Figure 15 is established.

Table 5.

Liquid contents of tank $8^a$ and tank $8^f$ equalize,
Liquid contents of tank $8^h$ and tank $8^g$ equalize,
Liquid contents of tank $8^b$ and tank $8^e$ equalize, and
Liquid contents of tank $8^c$ and tank $8^d$ equalize.

Thus the relation shown in Figure 16 is established.

Table 6.

Liquid contents of tank $8^a$ and tank $8^g$ equalize,
Liquid contents of tank $8^b$ and tank $8^f$ equalize,
Liquid contents of tank $8^c$ and tank $8^e$ equalize.

Figure 17:
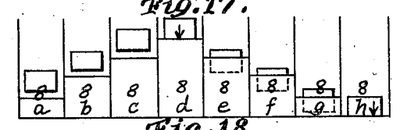

Tank $8^h$ is emptied and tank $8^d$ has a corresponding volume replaced, and the relation in Figure 17 is established.

Table 7.

Liquid contents of tank $8^a$ and tank $8^h$ equalize,
Liquid contents of tank $8^b$ and tank $8^g$ equalize,
Liquid contents of tank $8^c$ and tank $8^f$ equalize, and
Liquid contents of tank $8^d$ and tank $8^e$ equalize.

Figure 18:
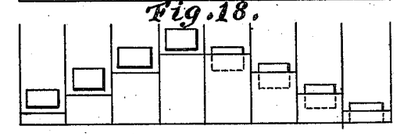

Thereby the relation shown in Figure 18 is established.

Table 8.

Liquid contents in tank $8^b$ and tank $8^h$ equalize,
Liquid contents in tank $8^c$ and tank $8^g$ equalize, and
Liquid contents in tank $8^d$ and tank $8^f$ equalize.

Figure 19:
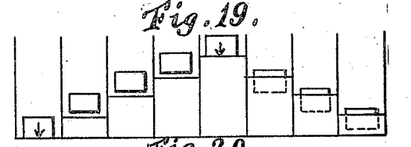

Tank $8^a$ empties and tank $8^e$ has an equal volume replaced, and the relation is as shown in Figure 19.

Table 9.

Liquid contents of tank $8^c$ and tank $8^h$ equalize,
Liquid contents of tank $8^d$ and tank $8^g$ equalize,
Liquid contents of tank $8^e$ and tank $8^f$ equalize, and
Liquid contents of tank $8^b$ and tank $8^a$ equalize.

Figure 20:
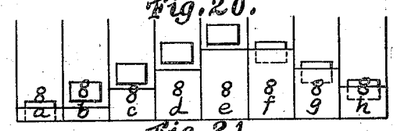

The relation in Figure 20 is thus established.

Table 10.

Liquid contents of tank $8^d$ and tank $8^h$ equalize,
Liquid contents of tank $8^e$ and tank $8^g$ equalize, and
Liquid contents of tank $8^c$ and tank $8^a$ equalize.

Figure 21:
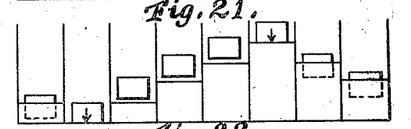

Tank $8^b$ empties, a like volume of liquid is displaced in tank $8^f$, and the relation in Figure 21 is established.

Table 11.

Liquid contents of tank $8^e$ and tank $8^h$ equalize,
Liquid contents of tank $8^c$ and tank $8^f$ equalize,
Liquid contents of tank $8^d$ and tank $8^a$ equalize, and Liquid contents of tank 8$^f$ and tank 8$^g$ equalize.

Figure 22:
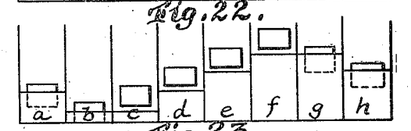

The relation of Figure 22 is thus established.

*Table 12.*

Liquid contents of tank 8$^f$ and tank 8$^h$ equalize,

Liqiud contents of tank 8$^e$ and tank 8$^a$ equalize, and

Liquid contents of tank 8$^d$ and tank 8$^f$ equalize.

Figure 23:
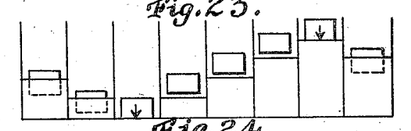

Tank 8$^c$ empties, and a like volume is replaced in tank 8$^g$, thereby the relation in Figure 23 is established.

*Table 13.*

Liquid contents of tank 8$^g$ and tank 8$^h$ equalize,

Liquid contents of tank 8$^f$ and tank 8$^a$ equalize,

Liquid contents of tank 8$^e$ and tank 8$^b$ equalize, and

Liquid contents of tank 8$^d$ and tank 8$^c$ equalize.

Figures 24, 25:
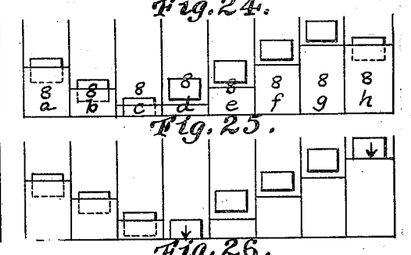
Figure 26:
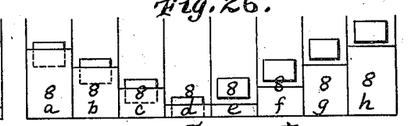

The relation shown in Figure 24 is thus established.

*Table 14.*

Liquid contents of tank 8$^g$ and tank 8$^a$ equalize,

Liquid contents of tank 8$^f$ and tank 8$^b$ equalize, and

Liquid contents of tank 8$^e$ and tank 8$^c$ equalize.

Tank 8$^d$ empties, and a like volume of water is replaced in tank 8$^h$, establishing the relation as shown in Figure 25.

*Table 15.*

Liquid contents of tank 8$^h$ and tank 8$^a$ equalize,

Liquid contents of tank 8$^g$ and tank 8$^b$ equalize,

Liquid contents of tank 8$^f$ and tank 8$^c$ equalize, and

Liquid contents of tank 8$^e$ and tank 8$^d$ equalize.

The relation shown in Figure 20 is thus established.

*Table 16.*

Liquid contents of tank 8$^h$ and tank 8$^b$ equalize,

Liquid contents of tank 8$^g$ and tank 8$^c$ equalize, and

Liquid contents of tank 8$^f$ and tank 8$^d$ equalize.

Tank 8$^e$ empties, and a like volume of water is replaced in tank 8$^a$, thereby establishing the initial positions as shown in Figure 11, when the described sequence of operations is repeated.

The tank conduits 13, and the tank-connecting valves, are preferably formed to permit a rapid and nearly instantaneous interchange of liquid from tank to tank, the out flow of liquid from any tank being sufficiently rapid to leave the accompanying weight entirely unsupported by liquid, so that it will fall freely, and the rise of liquid in any tank being sufficiently rapid to cause the displacement of the accompanying weight to exert greater force on the power shaft 20, than is exerted by the simultaneously falling weight. The simultaneously falling weights are at all times at different elevations, and the simultaneously rising weights are likewise at all times at different elevations. The force due to displacement in each rising weight depends on the height of the weight with relation to the height of the other weights.

It will be seen that when eight tanks are employed, the charge of liquid supplied to a tank is used eight times before it is exhausted, and runs to waste. In practice, about seven-eighths of each charge is used eight times before the charge is run out or exhausted.

While one weight drops from top to bottom of a tank, or rises from bottom to top, I have the use of the power of displacement of four rising weights, also the power of the gravity of four falling weights. For example, if one tank of liquid holds two thousand pounds, and one falling weight weighs two hundred and sixty-eight pounds, and the pressure of one rising weight gives displacement or upward pressure of three hundred and fifty-eight pounds, these two combined give a pressure of six hundred and twenty-six pounds. When eight weights are employed, this would give four times six hundred and twenty-six pounds, or a total of two thousand, five hundred and four pounds continuous pressure, at a loss of two hundred and fifty pounds at every second cycle. This total pressure is practically continuous from the starting of the battery.

By the employment of a battery of motors, each motor being connected with every other motor of the battery, by the described system of valves, I obtain the advantage of using the liquid over and over, losing only one-eighth of one charge every other cycle, or one-half of a charge in the complete drop of a weight, and another half in the complete rise of a weight.

A balance wheel 100 is fixed to the power shaft 20, for the purpose of keeping up a uniform torque while any tank is exhausting or filling from the supply tank.

When the battery is started, all the buoyant weights are in the positions shown in Figure 11, and the eccentric 39 and pawl 38 (Figure 2) are ready to advance the tubular valves simultaneously one step, (Figure 1). The partial filling and exhausting of the tanks now takes place. The time consumed by the filling and exhausting constitutes one cycle, and is governed by the size of the tanks and of the valve ports. When the first cycle is completed, the tanks and the liquid are in the positions shown in Figure 12. The moment this position is attained, the pawl 38 (Figure 2) again advances the valves one step, causing the change in the positions of the weights and liquid shown in Figure 13. As shown by Figure 5, port 93 is as wide as the total of the seven small ports 8$^b$ to and including the port 8$^h$, in the upper portion of Figure 5.

It will be seen that the large port 8$^e$ in Figure 5, is also as wide as the total width of the seven small ports on each side of it. This rule holds good throughout, unless the large or exhausting port is partially in one valve, and the rest in another valve (see Figure 8). Port 8$^g$ is shown here only the width of the four small ports at its left. A part of port 8$^g$ is shown in Figure 6, where it supplies ports 8$^a$ and 8$^b$. In consequence of this arrangement the liquid in a full tank is distributed to each of the other seven tanks, each receiving one-eighth. The remaining one-eighth is allowed to run to waste through port 60 (Figure 9).

The changing of the positions of the liquid and the weights that are in the eight motors, from the positions shown by Figure 11, to that shown by Figure 12, takes place at the same time. The ports in the valve casings are of the same dimensions as the filling ports in the tubular valves. A valve casing port has the same area as a filling port, and when port 93 covers the valve casing port, it can only supply the amount that can pass through it, which is the same as can pass through the small valve filling port. For example, suppose the tubular valve is sixteen inches in circumference, and the port 93 (Figure 5) is seven inches wide. The seven other ports that register with this port are each one inch wide. These become active successively, and only one inch of port 93 is active during each cycle, so that the port 93 is given sufficient capacity to supply the other seven ports, one after another.

It will be seen that while each weight 11 falls from its highest to its lowest level, and rises from its lowest to its highest level, the power developed is due to the gravity of the weights of one-half of the battery units, and the force of displacement of the weights of the other half.

It will also be seen that by employing a battery of units, each including a tank and a buoyant weight movable vertically therein, and connecting the tank of each unit with the tanks of all of the other units, by a system of conduits and valves as described. I obtain the advantage of using the major portion of the supplied liquid over and over during each cycle, only a minor fraction running to waste at each alternate cycle, this fraction being determined by the number of units in the battery. In a battery of eight units I lose one-eighth of a full tank at every second cycle. In a battery of sixteen units, I lose one-sixteenth of a full tank at every alternate cycle.

I claim:

1. A motor comprising a series of tanks, liquid circulating means for supplying liquid thereto including conduits interconnecting said tanks as described, and rotary valve elements controlling the said conduits, buoyant weight non-synchronously movable in said tanks by liquid supplied to and successively exhausted from the tanks, and means for utilizing the movements of said weights to rotate said valve elements step-by-step, and to transmit unidirectional continuous rotary motion from the motor, the liquid and the weights being arranged at different elevations, and the arrangement being such that some of the weights are left unsupported by liquid, and free to act by gravity when the accompanying tanks are being exhausted, and the other weights are caused to act by displacement when the accompanying tanks are being refilled.

2. A motor substantially as specified by claim 1, said liquid-circulating means including exhaust and supply valves constituting members of said step-by-step rotated valve elements.

3. A motor comprising a series of tanks, means for supplying liquid thereto, a series of independently movable buoyant weights adapted to be supported by liquid in said tanks, means including elements actuated by the weights for selectively transferring liquid from any tank of the series to any of the other tanks, and adapted to cause non-synchronous vertical reciprocating movements of the weights, and means for utilizing the said reciprocating movements, the liquid and the weights being arranged at different elevations, and the arrangement being such that some of the weights are left unsupported by liquid, and free to act by gravity when the accompanying tanks are exhausted, and the other weights are caused to act by displacement when the accompanying tanks are being refilled.

4. A motor substantially as specified by claim 3, said liquid-transferring means including conduits communicating with the lower portions of the tanks, tubular valve casings, each communicating with all of said conduits through fixed ports, and tubular rotary valves in said casings, and connected for simultaneous rotation, each having a plurality of ports, two ports of each valve being arranged to register simultaneously with two ports in the accompanying casing, means impelled by said buoyant weights being provided for rotating said valves step-by-step.

5. A motor substantially as specified by claim 3, said liquid-transferring means including conduits communicating with the lower portions of the tanks, tubular valve casings, each communicating with all of said conduits through fixed ports, tubular valves movable in said casings, and connected for simultaneous rotation, each having a plurality of ports, two ports of each valve being arranged to register simultaneously with two ports in the accompanying casing, and connections between said valves and said power-transmitting shaft, organized to impart a step-by-step rotation to the valves from the continuously rotating shaft.

6. A motor substantially as specified by claim 3, said liquid-transferring means including conduits communicating with the lower portions of the tanks, tubular valve casings, each communicating with all of said conduits through fixed ports, tubular valves movable in said casings, and connected for simultaneous rotation, each having a plurality of ports, two ports of each valve being arranged to register simultaneously with two ports in the accompanying casing, a ratchet fixed to one of said valves, a pawl adapted to engage said ratchet, and connections between said pawl and the power-transmitting shaft adapted to reciprocate the pawl and cause a step-by-step rotation of the valves.

7. A motor substantially as specified by claim 3, said liquid-transferring means including conduits communicating with the lower portions of the tanks, tubular valve casings, each communicating with all of said conduits, through fixed ports, and tubular valves movable in said casing, each having a plurality of ports, two ports of each valve being arranged to register simultaneously with two ports in the accompanying casing, a train of gears fixed to and connecting said valves, and connections between one of the end gears of said train and the power-transmitting shaft, organized to rotate said gear, and through it, the other gears of the train and the valves, step-by-step.

8. A motor substantially as specified by claim 3, said liquid-transferring means having provisions actuated by said buoyant weights for intermittently introducing liquid into the upper portions of the tanks.

9. A motor substantially as specified by claim 3, said liquid-transferring means including conduits communicating with the lower portions of the tanks, tubular tank-connecting valve casings, each communicating with all of said conduits through fixed ports, tubular tank-connecting valves movable in said casings, and connected for simultaneous rotation, each having a plurality of ports, two ports of each valve being arranged to register simultaneously with two ports in the accompanying casing, a tubular exhaust valve casing, a tubular exhaust valve in said casing, an elevated supply tank, a tubular inlet valve casing communicating with the supply tank, and a tubular inlet valve in said casing, said exhaust and inlet valves being rotated step-by-step.

10. A motor comprising a series of tanks located at the same level, conduits communicating with the lower portions of the tanks, a plurality of tubular tank-connecting valve casings, each communicating with said conduits through fixed ports, tank-connecting tubular valves in said casings having ports arranged to cooperate as described, with said fixed ports, means for supplying liquid to said tanks, and means for simultaneously rotating said valves step-by-step, the arrangement being such that the liquid is maintained by said valves at different elevations in the tanks, the said valve-rotating means including buoyant weights maintained at different levels by said liquid, and mechanism for utilizing the rise and fall of the weights to impart step-by-step movements to the valves, said mechanism being adapted also to transmit power from the motor.

11. A motor comprising a series of tanks located at the same level, conduits communicating with the lower portions of the tanks, a plurality of tubular tank-connecting casings, each communicating with said conduits through fixed ports, tank-connecting tubular valves in said casings, having ports arranged to cooperate with said fixed ports, an inlet casing communicating with the upper portions of the tanks through fixed ports, and containing a tubular inlet valve, having ports arranged to cooperate with the inlet casing ports, an exhaust casing communicating with the lower portions of the tanks through fixed ports, and containing a tubular exhaust valve having ports arranged to cooperate with the exhaust casing ports, and means for simultaneously rotating said valves step by step, said means including buoyant weights maintained at different levels in the tanks, and mechanism for utilizing the rise and fall of the weights to impart step-by-step movements to the valves and to transmit power from the motor, the ports of said inlet and exhaust casings and valves being arranged to cause the weights to rise and fall non-synchronously, during a cycle of operation of the motor, to utilize the supplied liquid repeatedly in all of the tanks during each cycle, and to permit only a minor portion to run to waste.

In testimony whereof I have affixed my signature.

MORITZ THEODORE LINDENBERG.